Patented Oct. 20, 1936

2,057,765

UNITED STATES PATENT OFFICE 2,057,765

POLYHYDRIC ALCOHOL-POLYBASIC ACID RESINS AND COMPOSITIONS CONTAINING THEM

Merlin Martin Brubaker, Wilmington, Del., assignor to E. I. du Pont de Nemours & Company, Wilmington, Del., a corporation of Delaware No Drawing. Application January 17, 1930, Serial No. 421,585

10 Claims. (Cl. 260—8)

This invention relates to the art of synthetic resins, and more particularly to the art of polyhydric alcohol-polybasic acid resins and compositions containing them.

By the term "polyhydric alcohol-polybasic acid resin", as used herein, I mean the resinous condensation product resulting from the interaction of one or more polyhydric alcohols and one or more organic polybasic acids, with or without one or more modifying ingredients, such as the following: drying oils, semi-drying oils, non-drying oils, monohydric alcohols, monobasic or dibasic acids, especially those derived from drying oils, semi-drying oils, and non-drying oils, natural resins and other synthetic resins.

By the term "modified polyhydric alcohol-polybasic acid resin", as used herein, I mean a resin of the type referred to in the preceding definition when one or more of the modifying ingredients are used.

By the term "modifying ingredient" or "modifying agent", as used herein, I mean an ingredient of the type indicated as "modifying ingredients" in the foregoing definition of "polyhydric alcohol-polybasic acid resin."

By the term "solvent", as used herein in conjunction with the preparation of the resin, I mean a material with which the resulting resin is miscible in the proportions used.

By the term "substantially non-reactive solvent", as used herein, I mean a solvent for the resulting resin, which is substantially non-reactive with the ingredients used in the preparation of the resin, as well as with the resulting resin itself, under the temperature conditions of resin preparation.

By the term "miscible", as used herein, I mean that the resulting mixture is homogeneous.

Various methods have been proposed for the production of polyhydric alcohol-polybasic acid resins but, so far as known, none of these methods are universally applicable and all of them are objectionable under certain circumstances. In one of these prior methods the polyhydric alcohol and the polybasic acid, with or without modifying ingredients, are heated together until resinification is substantially complete. This method, however, is not generally applicable to the production of oil modified resins in which the drying or semi-drying oils themselves are used to introduce the drying component, and even though the oil acids are used it is practically impossible to get a low acid number with resins having a high proportion of the glyceryl phthalate component, on account of gelation. In another method the polyhydric alcohol and the modifying agent, particularly where the latter is a drying oil or semi-drying oil, are heated together until reaction occurs, and the resulting product is subsequently heated with the polybasic acid.

I have found that the above mentioned disadvantages may be overcome, and that many additional desirable results can be obtained, by heating the reaction ingredients in the presence of a solvent for the resulting resin.

It is therefore an object of this invention to provide a new and improved method of making polyhydric alcohol-polybasic acid resins.

It is a further object of this invention to provide a method of making polyhydric alcohol-polybasic acid resins of lower acid number.

It is a still further object of this invention to provide a method of making resins which gives higher yields.

It is also an object of this invention to provide new and improved compositions containing polyhydric alcohol-polybasic acid resins.

With the above and other objects in view, which will be apparent as the description proceeds, I have set forth my invention in the following specification, and have included the following examples by way of illustration and not as a limitation:

*Example 1*

22.7 parts by weight of glycerol, 46.3 parts by weight of phthalic anhydride, 31.0 parts by weight of Chinawood oil acids, and 33.3 parts by weight of Hi-flash naphtha, are mixed and heated to the boiling point. The distillate, consisting of Hi-flash naphtha and the by-product of the reaction, water, is condensed, collected and separated, the Hi-flash naphtha being returned to the reaction vessel. While separation may be effected in any desired manner, I prefer to allow these two immiscible liquids to separate by gravity. This results in the water collecting in the bottom of the separator, with the Hi-flash naphtha, freed for the most part of water, on top, and I prefer to provide an outflow from that portion of the separator containing the Hi-flash naphtha, in order to allow it to flow back to the reaction vessel. This cycle is allowed to continue and, after about 2½ hours heating, the reaction mixture is clear and homogeneous and has a temperature of about 173° C. At this point 7.7 parts by weight of Hi-flash naphtha is added, and at every ½ hour interval during the course of the reaction another 7.7 parts by weight of Hi-flash naphtha is added until the quantity of solvent has been increased by 115.5 parts by weight at the end of 7 hours. About 7.09 parts by weight of water are separated and removed. The reaction mixture now contains about 60% Hi-flash naphtha and 40% resin, and the cycle is continued for 3½ hours at this concentration. The final resin solution, which has a viscosity of 10 to 15 poises, contains about 40% resin and has an acid number of 19.2. This corresponds to a yield of 92.5% by weight of solid resin, having an acid number of 48. A resin prepared from the same ingredients without the use of a solvent gels or becomes insoluble at an acid number of about 80 to 90. Furthermore, resins prepared by the above method dry much more rapidly, harden more rapidly, and are more resistant to the action of water, gasoline and weak alkali solutions than resins prepared from the same ingredients by the fusion method.

In many cases it is desirable, as indicated above, to begin the reaction using a relatively low concentration of solvent in order that the mixture may become homogeneous and clear in a short while. At this high concentration of resin, however, the mass becomes viscous as the resin is formed and it is desirable to gradually dilute with more solvent in order to reduce the viscosity.

*Example 2*

22.7 parts by weight of glycerol, 46.3 parts by weight of phthalic anhydride, 31.0 parts by weight of Chinawood oil acids, and 30.0 parts by weight of xylol are heated to the boiling point of the mixture and the distillate, consisting of xylol and the by-product of the reaction, water, is condensed, collected and separated, and the xylol returned to the reaction vessel, as in Example 1, except that the resin preparation is carried through at a single concentration of solvent instead of increasing the latter by adding additional quantities of solvent. This cycle is allowed to continue for about 15 hours, by which time the solid resinous portion of the reaction product has an acid number of about 60. The resulting product is approximately a 60% solution of the resin in the solvent, and contains about 95 parts by weight of solid resin (i. e., a yield of about 95%). If diluted with xylol to a 40% solution it has a viscosity of about 3 to 4 poises and dries to a tack free flexible film in about 15 minutes. For many purposes the resulting mixture in the reaction vessel at the time the desired acid number is reached may be used without removing the solvent.

*Example 3*

23.43 parts by weight of Chinawood oil and 4.56 parts by weight of glycerol are heated together with 0.028 parts by weight of sodium hydroxide for 1 hour at 225° C. The resulting 28 parts by weight of Chinawood monoglyceride, 18 parts by weight of linseed oil acids, 14.14 parts by weight of glycerol, 39.87 parts by weight of phthalic anhydride, and 33.3 parts by weight of Hi-flash naphtha are mixed together and heated in a manner similar to that explained under Example 1, except that the reaction mixture is agitated mechanically. After the distillation and separation of water has been continued for 3 hours a sample will be found to remain homogeneous on cooling. 7.0 parts by weight of Hi-flash naphtha is added at this point, and at each ½ hour interval until the amount of solvent has been increased by about 35 parts by weight, giving a 60% concentration of resin. The reaction is carried through to completion at this dilution by continuing the cycle for 6 hours, during which time 4.72 parts by weight of water separate and are removed. The acid number of the solid resinous portion of the solution is 36.5. A 40% solution of this resin in Hi-flash naphtha has a viscosity of 9 poises. If the resin is prepared from the same ingredients without the use of a solvent it gels or becomes insoluble at an acid number of about 40 on a laboratory scale, but on a commercial scale it cannot be safely carried to an acid number below 45 to 50.

*Example 4*

1275 parts by weight of linseed oil, 215 parts by weight of glycerol, and 1.9 parts by weight of sodium hydroxide, are heated at 250° C. for 2 hours with mechanical agitation. The resulting homogeneous linseed monoglyceride, 507.9 parts by weight of phthalic anhydride, and 964.0 parts by weight of a gasoline fraction having a boiling range of 200 to 230° C. are mixed and distilled as described under Example 1. The distillation and separation of water are continued, without altering the concentration of the solvent, for 20 hours. The final resin solution contains 66% of a solid resin, having an acid number of 6.0. When using this gasoline fraction as the only solvent the distillation must be carried out very slowly or phthalic anhydride will crystallize in the condenser and not be returned to the reaction mass with the solvent. To avoid this slow distillation, 10% of the gasoline fraction may be replaced by Hi-flash naphtha to give a solvent mixture sufficiently active to prevent crystallization of phthalic anhydride in the condenser. A resin prepared from the same ingredients without a solvent has a different composition because the long heating necessary to bring the acid number down to 6.0 results in considerable loss of phthalic anhydride.

*Example 5*

191.0 parts by weight of Chinawood oil acids, 83.6 parts by weight of glycerol, 134.5 parts by weight of phthalic anhydride and 90.9 parts by weight of rosin are melted together by heating for 1 hour at 200° C. The mixture is cooled, dissolved in 333 parts by weight of Hi-flash naphtha, and then distilled as in Example 1. Esterification is thus carried out in solution for 1 hours, and 417 parts by weight of Hi-flash naphtha is then added. The process is continued for another 30 hours and a final resin solution containing 40% solid resin, of acid number 42, is obtained. This solution has a viscosity of approximately 40 poises.

The method described above does not give a resinous product of low viscosity in solution, but is useful where it is necessary to bring the product "up to body" in a manner comparable with varnish practice. By adding the solvent at first and carrying out the reaction in a somewhat more concentrated solution, it is possible to obtain a resin of similar composition having an acid number of 40, and giving a 45% solution in Hi-flash naphtha having a viscosity of about 12 poises.

*Example 6*

242.7 parts by weight of glycerol, 308.6 parts by weight of stearic acid, 448.7 parts by weight of phthalic anhydride, and 200.0 parts by weight of Hi-flash naphtha are subjected to continuous distillation at about 170° C., as described in Example 1. After 4 hours an additional 300 parts by weight of Hi-flash naphtha is added and the process is continued for 56 hours more, during which time the proportion of Hi-flash naphtha is gradually increased to give a final solution having a viscosity of about 20 poises and containing 40% of a solid resin having an acid number of 18. A resin prepared from the same ingredients without the use of a solvent gels at an acid number of about 27. The resin prepared in solution "sets up" to a continuous clear film while the resin prepared by the fusion method gives a cloudy wax-like film. If the content of stearic acid is reduced to prevent the waxy effect the resin gels at a comparatively high acid number, leaving considerable uncombined stearic acid which may later exude or crystallize on the surface to give a "bloom." Since much more complete esterification can be effected by the solution method before the resin gels, it is possible to produce stearic acid modified resins having new properties.

In some cases where it is desired to use the resulting resin in a lacquer I prefer to stop the reaction at an intermediate point, such as after 30 hours, at which time the solution contains 50% solids and the corresponding solid resinous product has an acid number of 23, whereas a 40% solution of this intermediate resin has a viscosity of about 15 poises.

Example 7

100.7 parts by weight of mannitol, 199.3 parts by weight of phthalic anhydride, and 60 parts by weight of cyclohexanone are heated as described in Example 1 for 15 hours. 50 parts by weight of cyclohexanone is then added. The heating is continued for 7 hours, after which another 50 parts by weight of cyclohexanone is added. After another 25 hours heating period, making a total of 47 hours heating, a resin solution containing 64% of solid resin, having an acid number of 130, is obtained. A similar resin prepared by fusing the ingredients without a solvent, in a closed vessel fitted with a short air-cooled reflux condenser, gels at an acid number of 176.

Example 8

102.1 parts by weight of glycerol, 197.9 parts by weight of adipic acid, and 60 parts by weight of commercial diethyl ether of ethylene glycol are mixed and heated as in Eaxmple 1 for 26 hours, giving a resin solution containing about 80% of solid resin having an acid number of 65. A resin prepared from the same proportions of adipic acid and glycerol without the use of a solvent gels at an acid number of about 110.

Example 9

405.7 parts by weight of rosin and 219.8 parts by weight of glycerol are heated, accompanied by mechanical agitation, and a short air-cooled reflux condenser at 250° C. for 4 hours to an acid number of about 5.0. This product is cooled and 374.5 parts by weight of phthalic anhydride and 665.0 parts by weight of anisole are added. The mixture is heated and the anisole distilled, as in Example 1. The cycle is continued for 25½ hours, giving a 60% solution of a resin in anisole. The acid number of the solid resin is 30.0. The closest corresponding resin made by the fusion method is obtained by carrying out the reaction in a closed vessel to reduce the loss of phthalic anhydride, first reacting the glycerol and rosin and then adding the phthalic anhydride. This resin gels and becomes insoluble at an acid number of 50. Furthermore, this resin is not clear, whereas the resin prepared in solution is a clear, homogeneous product.

Example 10

145.8 parts by weight of Chinawood oil acids, 113.7 parts by weight of glycerol, 231.5 parts by weight of phthalic anhydride, and 200 parts by weight of toluol are placed in an iron autoclave equipped with a stirrer, thermometer, pressure gauge, outlet for solvent vapors, and small tube for the return of solvent, the outlet for the solvent vapors being connected with a condenser, and the condensed vapors being passed from the latter through a separator as in Example 1. About 25 lbs. per square inch pressure is applied to the apparatus, using carbon dioxide gas, and the mixture in the autoclave is heated to the boiling point (155° to 160° C.) Continuous distillation and separation are carried out as in Example 1, the water being removed from the solvent and the latter being returned to the autoclave. Heating is continued for a total of 12 hours and additional toluol is continuously added during the course of the reaction, the amount added being sufficient to give a final product containing 50% of a solid resin. The latter has an acid number of 53.5. If the final solution is diluted with additional toluol until it has 40% solids the viscosity is 0.5 to 0.6 poise. Films of this solution dry tack free in from 3 to 5 minutes.

The resins prepared as indicated above are highly useful in coating compositions of various types, illustrative examples of which are as follows:

Example 11—Varnish

Sufficient Hi-flash naphtha is added to the 40% resin solution in Hi-flash naphtha of Example 1 to reduce the solid resin content to 29%, and 0.05% cobalt (as cobalt linoleate), based on the oil component present in the resin (35% of the solid resin is oil), is added. This gives a varnish which dries tack free in ½ hour and fairly hard in 1 to 2 hours. Light coats of the film may be rubbed with pumice and water after 5 to 6 hours. Films of this varnish are resistant to water, gasoline and weak alkali solutions, and possess an unexpected durability over wood or metal. The slow evaporation of the Hi-flash naphtha in the above varnish retards the drying of the resin to some extent, but by using the resin solution of Example 2 a more rapid drying varnish, especially suitable for spray application, may be prepared. The xylol solution of that resin is thinned to a spraying consistency with equal parts of xylol and butyl acetate, and the cobalt drier solution is added. Films of the varnish dry tack free in 15 to 20 minutes.

Example 12—Black enamel

| | Parts by weight |
|---|---|
| Resin solution of Example 1 | 371.2 |
| Carbon black | 20.8 |
| Hi-flash naphtha | 94.3 |
| Total | 486.3 |

This mixture is ground for 48 hours in a ball mill using steel balls, in the ratio of 2 parts by weight of balls to 1 of the mixture, to give a mill base from which a medium gloss enamel of the following composition is prepared by adding additional Hi-flash naphtha, and by adding cobalt linoleate to serve as a drier:

|                                         | Parts by weight |
|-----------------------------------------|-----------------|
| Resin solution of Example 1             | 65.35           |
| Carbon black                            | 3.67            |
| Hi-flash naphtha                        | 30.98           |
| Metallic cobalt (present a cobalt linoleate) | 0.012       |
| Total                                   | 100.012         |

This enamel is of a consistency suitable for spray application and has a viscosity of about 0.5 poise. It contains about 30% solids, and has a gallon weight of 8.1 lbs. The enamel dries very rapidly to give a hard, durable medium gloss film.

Because of the tendency of the vehicle to combine with oxygen very rapidly, I prefer to carry out the grinding in an atmosphere of carbon dioxide, which can be readily done by sweeping the air from the ball mill with a stream of carbon dioxide before the grinding operation.

*Example 13—Clear lacquer*

|                                         | Parts by weight |
|-----------------------------------------|-----------------|
| Final resin solution of Example 6       | 50.0            |
| Nitrocellulose (½ second viscosity)     | 10.0            |
| Solvents:                               |                 |
| Toluol                                  | 36.1            |
| Butyl alcohol                           | 12.3            |
| Butyl acetate                           | 23.9            |
| Ethyl alcohol                           | 16.1            |
| Ethyl acetate                           | 27.9            |
| Total                                   | 176.3           |

This lacquer contains 17% solids and has a viscosity of about 1.0 poise. A film of this lacquer dries rapidly, sands very readily and is admirably adapted for use as a shellac substitute.

Obviously other resins, solvents, pigments and driers, may be used in addition to or in place of those indicated in the above compositions, and other ingredients, such as fillers, drying oils, softeners and plasticizers, may be used where desired.

Although the above examples are limited to the use of glycerol and mannitol as the polyhydric alcohols, phthalic anhydride and adipic acids as the polybasic acids, and Chinawood oil acids, linseed oil acids, Chinawood oil, linseed oil, stearic acid and rosin, or mixtures of these, as the modifying ingredients, I desire to have it understood that the invention is applicable generally to the other members of these groups, and to all synthetic resins falling within the above definitions of polyhydric alcohol-polybasic acid resins, or modified polyhydric alcohol-polybasic acid resins.

Similarly, although the solvents used in the preparation of the above resins are limited to toluol, xylol, Hi-flash naphtha, a gasoline fraction boiling between 200 and 230° C., anisole, cyclohexanone, and the diethyl ether of ethylene glycol, I desire to have it understood that many other solvents may be used, such as varnish makers and painters' naphtha, acetylene tetrachloride, ortho dichlorbenzene, turpentine and pinene. Various mixtures of solvents may also be used. Certain resins, for example those containing more than 50% of phthalic anhydride and glycerol, are not sufficiently soluble in aliphatic hydrocarbons. However, a mixture of xylol and an aliphatic hydrocarbon of the corresponding boiling range, such as mineral spirits, will form a suitable solvent unless the phthalic anhydride and glycerol content is unusually high, for example, greater than 70%. In the latter class of cases, as well as in synthetic resins modified with larger amounts of natural resins, for example 40% of rosin, the solvent should be a more active one, depending on the solubility characteristics of the particular synthetic resin. Examples of such solvents are the diethyl ether of ethylene glycol, cyclohexanone and triethylin.

I prefer not to use organic esters, primary or secondary alcohols, or acids as the solvent, particularly with resins modified by a drying oil component, since a certain amount of reaction takes place and the introduction of one of these constituents may retard the drying of the resin.

Summarizing the above, I prefer to use solvents which are aliphatic or aromatic hydrocarbons, or their halogen derivatives, aliphatic or aromatic ethers, terpenes or ketones.

In general I prefer to use low boiling solvents, such as those having a boiling point of from 110° to 210° C., since high boiling solvents soften or plasticize the resulting product.

It will also be obvious that other methods of separating the water from the solvent may be used, such as the use of drying agents like calcium chloride and silica gel. Where desired, fresh solvent may be added to the reaction mixture, as in Example 1, either in addition to or in place of that returned after the removal of the major portion of the water from the distillate as above indicated. I prefer, however, to separate the recovered solvent from the water and return it to the reaction mixture.

In cases where the solvent is heavier than water, such as acetylene tetrachloride and ortho dichlorbenzene, and a gravity separation of solvent and water is restorted to, it will be obvious that the outflow point for the recovered solvent will be below the bottom of the water layer.

As indicated in Example 4, where drying oils are to be incorporated directly, it is necessary to preheat the polyhydric alcohol and the drying oil before the polybasic acid is added thereto, thus forming a partially acylated polyhydric alcohol.

In other cases, I may fuse all or part of the reaction ingredients before adding the solvent and, in fact, the solvent may be added at any time during the reaction, although the present invention does not include within its scope cases in which the finished resin is merely dispersed in a solvent, since it is a point of the present invention to utilize the presence of the solvent in bringing about a large portion of the resin forming reaction.

Likewise, small amounts of holding agents, such as urea, may be incorporated with the reaction ingredients to retard gelation.

Also, where it is desired that the resin shall have still greater water resistance, as in the case of resins containing substantial amounts of linseed oil as a modifying ingredient, the desired water resistance may be imparted in any suitable manner, as by treating the resin solution with a small amount of litharge (e. g., 5%).

As indicated in Examples 11, 12 and 13, it will be apparent that resins produced by this method have a very wide usefulness. The solutions may be used directly as varnishes over wood or metal, for impregnation of fibrous materials, for wire enamels or for insulating materials. The resin solutions may be incorporated with pigments, dyes or fillers to produce paints, varnishes, enamels or undercoats, or may be mixed with nitrocellulose, other cellulose esters, pigments, softeners, natural or synthetic resins, or drying oils, to form lacquers and enamels. The resins obtained from these solutions may be used for molding purposes either with or without other materials, such as pigments and fillers, in which case part or all of the solvent must be removed by distillation. The resin solutions may be used as adhesives for any type of laminated structures, either rigid or non-rigid, and as cements or binding materials for various types of abradants.

The method of preparing resins in solution has many advantages over previous methods, in that it produces new and useful products and permits the production of resins of lower acid number than is possible by prior methods. There are many other advantages, such as the fact that an increased yield of resin is obtained from the ingredients used since there is no appreciable loss of phthalic anhydride or other volatile constituents. When preparing resins of this type by the previous methods about 75 to 85% of the weight of ingredients is converted into useful resinous products, although in exceptional cases yields as high as 90% have been noted, whereas a 90 to 95% yield is usually obtained by preparing resins in solution.

The production of resins by this method may be controlled more accurately. For example, with certain types of resins the acid number may vary by 10 points from batch to batch when prepared by the ordinary method, whereas I am able to control the acid number on the same resin within 3 points by the solution method.

By way of showing that the new resinous products produced by the solution method may be uniformly heat treated to a lower acid number without danger of gelation than is possible by other methods, I desire to point out that a combination of resin ingredients which would ordinarily gel at an acid number of about 45, when prepared by the fusion method, can be heat treated to an acid number of about 30 by this method.

An inert gas is quite commonly used in order to exclude air in the fusion method of preparing these resins, but when they are prepared by this method the solvent provides a blanket.

A much lower temperature is necessary for the preparation of resins by my method and a wider variety of heat sources is available. Still another important advantage of the solution method is the fact that the heat is uniformly distributed throughout the reaction mass by the refluxing solvent and very large size factory batches may be produced. Not only that, but alteration in the scale of operation affects the results less markedly than with the fusion method. Furthermore, owing to the relatively low temperature at which the reaction may be carried out certain alcohols, such as mannitol, may be used, whereas the resulting excessive darkening by the fusion method has heretofore militated against their use in polyhydric alcohol-polybasic acid resins.

It will therefore be apparent that I have developed a new and useful method of making polyhydric alcohol-polybasic acid resins and modified polyhydric alcohol-polybasic acid resins, that such resins possess many properties not heretofore possessed by corresponding resins made by other methods, and that these resins are useful in the production of a wide range of commercial products, such as coating compositions, plastics, impregnating materials and insulating materials.

As many apparently widely different embodiments of this invention may be made without departing from the spirit and scope thereof, it is to be understood that I do not limit myself to the specific embodiments thereof except as defined in the appended claims.

I claim:

1. Process for making resins which comprises heating a polyhydric alcohol, a resinifying polycarboxylic acid, and a member of the class consisting of fatty oil acids and polyhydric alcohols partially esterified therewith, in the presence of a water-immiscible solvent for the resin which under resinification conditions is chemically non-reactive towards the resin and the resin ingredients, and removing solvent and water by distilling them off from the system, said process being carried out in the absence of an acidic esterification catalyst, at a temperature sufficiently high to cause resinification, and for a period of time insufficient to cause gelation.

2. Process for making resins which comprises heating a polyhydric alcohol, a resinifying polycarboxylic acid and drying oil acid in the presence of a water-immiscible solvent for the resin which under resinification conditions is chemically non-reactive towards the resin and the resin ingredients, and removing solvent and water by distilling them off from the system, said process being carried out in the absence of an acidic esterification catalyst, at a temperature sufficiently high to cause resinification, and for a period of time insufficient to cause gelation.

3. Process which comprises heating 22.7 parts by weight of glycerol, 46.3 parts by weight of phthalic anhydride, and 31.0 parts by weight of Chinawood oil acids in the presence of Hi-flash naphtha, removing Hi-flash naphtha and water of reaction by distillation and condensation, separating the water from the Hi-flash naphtha while both are in the liquid phase, and returning the latter to the reaction zone, said process being carried out in the absence of an acidic esterification catalyst, at a temperature sufficiently high to cause resinification, and for a period of time insufficient to cause gelation.

4. The resin solution produced in accordance with the process of claim 1.

5. The resin solution produced in accordance with the process of claim 2.

6. Process for making resins of lower acid number than it is possible to obtain with the same ingredients by the direct fusion method, which comprises heating esterifiable resin ingredients comprising a polyhydric alcohol, a member of the class consisting of fatty oil acids and polyhydric alcohols partially esterified therewith, and a resinifying polycarboxylic acid to a temperature of 110° to 210° C. in the presence of a solvent for the final resin which is chemically non-reactive toward the resin and the resin ingredients, and permanently removing water of reaction by simultaneously distilling off both solvent and water to remove them from the system, the reaction being stopped when the resin solution will yield a resin of a lower acid number than is obtainable with the same ingredients by the direct fusion method.

7. Process for making resins which comprises heating esterifiable resin ingredients comprising a polyhydric alcohol, a member of the class consisting of fatty oil acids and polyhydric alcohols partially esterified therewith, and a resinifying polycarboxylic acid in the presence of a substantially water-immiscible solvent for the final resin which under the conditions of the process is chemically non-reactive toward the resin and the resin ingredients, continuously distilling solvent and water of reaction, condensing mixed vapors thereof, separating water from solvent while both are in the liquid phase, returning only solvent to the reaction vessel, and introducing additional solvent into the reaction vessel when the reacting mass becomes clear, said process being carried out in the absence of an acidic esterification catalyst, at a temperature sufficiently high to cause resinification, and for a period of time insufficient to cause gelation.

8. Process for making resins of lower acid number than it is possible to obtain with the same ingredients by the direct fusion method, which comprises reacting glycerol, phthalic anhydride, and Chinawood oil acids in the presence of a hydrocarbon solvent for the final resin, said solvent boiling at 110° to 210° C., continuously distilling solvent and water of reaction, condensing mixed vapors thereof, separating water from solvent while both are in the liquid phase, returning only solvent to the reaction vessel, and introducing additional solvent into the reaction vessel when the reacting mass becomes clear, the reaction being stopped when the resin solution will yield a resin of a lower acid number than is obtainable with the same ingredients by the direct fusion method.

9. The resin solution produced in accordance with the process of claim 8.

10. Process for making resins which comprises heating glycerol, phthalic anhydride and drying oil acid in the presence of an aromatic hydrocarbon solvent for the resin which under resinification conditions is chemically non-reactive towards the resin and resin ingredients, removing solvent and water by distillation and condensation, separating the water from the hydrocarbon while both are in the liquid phase, and returning the hydrocarbon to the reaction zone, said process being carried out in the absence of an acidic esterification catalyst, at a temperature sufficiently high to cause resinification, and for a period of time insufficient to cause gelation.

MERLIN MARTIN BRUBAKER.